(12) United States Patent
Horvath et al.

(10) Patent No.: US 10,220,924 B1
(45) Date of Patent: Mar. 5, 2019

(54) KAYAK WITH THERMOFORMED HULL AND ROTOMOLDED PEDAL DRIVE MOUNT

(71) Applicant: HURRICANE AQUA SPORTS, INC., Warsaw, NC (US)

(72) Inventors: Steve Horvath, Uxbridge (CA); Pat Renfro, Warsaw, NC (US)

(73) Assignee: HURRICANE AQUA SPORTS, INC., Warsaw, NC (US)

( * ) Notice: Subject to any disclaimer, the term of this patent is extended or adjusted under 35 U.S.C. 154(b) by 0 days.

(21) Appl. No.: 15/651,125

(22) Filed: Jul. 17, 2017

Related U.S. Application Data

(60) Provisional application No. 62/369,913, filed on Aug. 2, 2016.

(51) Int. Cl.
| | | |
|---|---|---|
| *B63B 35/71* | (2006.01) | |
| *B63H 16/20* | (2006.01) | |
| *B63B 5/24* | (2006.01) | |
| *B63B 9/06* | (2006.01) | |
| *B29K 23/00* | (2006.01) | |
| *B29D 22/00* | (2006.01) | |
| *B29K 55/02* | (2006.01) | |
| *B29L 31/30* | (2006.01) | |

(52) U.S. Cl.
CPC .............. *B63H 16/20* (2013.01); *B63B 5/24* (2013.01); *B63B 9/06* (2013.01); *B63B 35/71* (2013.01); *B29D 22/00* (2013.01); *B29K 2023/00* (2013.01); *B29K 2055/02* (2013.01); *B29L 2031/307* (2013.01); *B63B 2035/715* (2013.01); *B63B 2231/42* (2013.01); *B63H 2016/202* (2013.01)

(58) Field of Classification Search
CPC .. B63H 16/00; B63H 16/08; B63H 2016/085; B63H 16/14; B63B 35/71; B63B 2035/715

See application file for complete search history.

(56) References Cited

U.S. PATENT DOCUMENTS

| | | | |
|---|---|---|---|
| 1,041,679 A | 10/1912 | Sargent | 114/347 |
| 1,449,222 A | 3/1923 | Goethel | 114/352 |
| 2,666,933 A | 1/1954 | Engensperger | 114/352 |
| 2,999,253 A | 9/1961 | Lewis | 114/347 |
| 3,129,443 A | 4/1964 | Maturi et al. | 114/352 |

(Continued)

OTHER PUBLICATIONS

Exclusive First Look: Feelfree Kayaks' New Overdrive Motor and Pedal Drive www.Rapidmedia.com/kayakangler/categorises /gear/ 7842-.pdf as acccessed Jul. 13, 2016.

(Continued)

*Primary Examiner* — Andrew Polay

(74) *Attorney, Agent, or Firm* — MacCord Mason PLLC

(57) ABSTRACT

An improved kayak has a hull of thermoformed ABS plastic having a bow and a seat having a void between the bow and the seat, a top of the hull being a deck with a foam PVC block glued to a bottom face of the deck. A rotomolded polyethylene plastic insert is located in the void and joined to the hull by fasteners that pass through the insert and the deck of the hull and engage the foam PVC block within the hull, with caulking between the hull and the insert. A propulsion device is removably mounted in the rotomolded plastic insert that allows a user of the kayak to propel the kayak.

14 Claims, 9 Drawing Sheets

(56) References Cited

U.S. PATENT DOCUMENTS

| | | | |
|---|---|---|---|
| 3,822,427 A | 7/1974 | Ewart, Jr. | 114/352 |
| 3,916,468 A | 11/1975 | Tetreault et al. | 114/352 |
| 3,965,513 A | 6/1976 | Horiuchi | 114/352 |
| 4,138,753 A | 2/1979 | Wood | 441/129 |
| 4,226,206 A | 10/1980 | Wilson | 440/112 |
| 4,503,799 A | 3/1985 | Masters | 114/363 |
| 4,715,311 A | 12/1987 | Masters | 114/347 |
| 4,727,821 A | 3/1988 | Masters | 114/347 |
| 5,460,551 A | 10/1995 | Beres | 440/27 |
| 5,626,501 A * | 5/1997 | He | B63B 35/73 114/283 |
| 6,210,242 B1 * | 4/2001 | Howard | B63B 1/042 114/62 |
| 6,860,223 B2 | 3/2005 | Lee et al. | 114/364 |
| 7,007,628 B1 * | 3/2006 | Conley | B63C 11/49 114/347 |
| 9,914,519 B2 * | 3/2018 | Nutz | B63H 21/30 |
| 2008/0060569 A1 | 3/2008 | Howard et al. | 114/347 |
| 2009/0042461 A1 | 2/2009 | Walton | 440/6 |
| 2011/0114007 A1 * | 5/2011 | Flemons, III | B63B 3/38 114/347 |
| 2013/0032079 A1 | 2/2013 | Erdahl et al. | 114/347 |
| 2016/0075420 A1 | 3/2016 | Kiffmeyer et al. | |

OTHER PUBLICATIONS

Confluence Outdoor New Kayaks and More ICAST 2016 www.yakangler.com/kayaks-and-gear/item/3817-confluence.pdf as accessed Jul. 13, 2016.

Old Town Predator AnglingInternational.com Jul. 2016.

Hurricane Kayaks catalog 2017.

\* cited by examiner

KAYAK WITH THERMOFORMED HULL AND ROTOMOLDED PEDAL DRIVE MOUNT

BACKGROUND OF THE INVENTION

Acrylonitrile butadiene styrene (ABS) is a common thermoplastic polymer known for its lightness, stiffness, scratch resistance and toughness. It is known to make sit-on-top kayaks of thermoformed ABS plastic. Commercially, kayaks of this manufacture are available from several companies, including Hurricane Kayaks, of Warsaw, N.C., website: hurricaneaquasports.com. The ABS kayak hulls are formed in two major pieces, a thermoformed top deck and thermoformed bottom. The deck and bottom are seamed together forming a hollow hull. ABS kayaks are lighter in weight than comparably sized polyethylene kayaks and also stiffer and more scratch resistant than polyethylene kayaks, however they do not have the same impact strength as polyethylene kayaks.

It is also known to install propulsion devices such as pedal drives or motor drives amidships of a rotomolded polyethylene kayak. Examples of such propulsion devices are seen in prior US Patent publication US20160075420 to Kiffmeyer and US20090042461 to Walton, the disclosures of which are incorporated herein by reference. These types of propulsion device installations are only known to be in kayaks made of polyethylene. Polyethylene is a plastic of high durability and impact strength but low hardness and rigidity. It feels waxy when touched.

It has been found that propulsions systems like the ones described in the published patent applications of Walton and Kiffmeyer cannot be satisfactorily installed in thermoformed ABS kayaks, as the stresses imposed on the hull and deck by the propulsion system are too great for the ABS to sustain over time without the potential for cracking.

Accordingly, there is a need in the art to be able to add a propulsion device to a kayak made of ABS plastic.

SUMMARY OF THE INVENTION

The present invention fulfills one or more of these needs in the art by providing an improved kayak having a hull of thermoformed plastic that has a bow and a seat with a void between the bow and the seat. A rotomolded plastic insert is located in the void and a propulsion device is mounted in the rotomolded plastic insert that allows a user of the kayak to propel the kayak.

In a preferred embodiment the thermoformed plastic of the hull is ABS. Also preferred is for the rotomolded plastic of the insert to be polyethylene or polypropylene.

The rotomolded insert may be joined to the thermoformed hull by fasteners that pass through the insert and a top portion of the hull and engage a foam PVC block within the hull. The top of the hull may be identified as a deck and the PVC block is glued to a bottom face of the deck.

Desirably, the propulsion device is removably mounted to the insert.

Caulking may be included between the hull and the insert.

The invention can also be considered as an improved kayak with a hull of ABS plastic having a bow and a seat having a void between the bow and the seat, a polyethylene or polypropylene plastic insert located in the void, and a propulsion device mounted in the polyethylene or polypropylene plastic insert that allows a user of the kayak to propel the kayak.

The invention can also be considered as a method of making an improved kayak by thermoforming a kayak deck and separately thermoforming a kayak bottom, both the kayak deck and kayak bottom having a void between a kayak bow and a kayak seat, joining the kayak deck to the kayak bottom to form a kayak hull that has a void between the kayak bow and kayak seat, and mounting a rotomolded insert in the void, the rotomolded insert configured to receive a propulsion device that allows a user of the kayak to propel the kayak.

The method may include gluing a foam PVC block to an underside of the kayak deck before joining the kayak deck to the kayak bottom and affixing the insert to the kayak hull by passing fasteners through the insert and the kayak deck top to engage the foam PVC block within the hull.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

An Acrylonitrile butadiene styrene (ABS) pedal drive kayak has not previously been possible. ABS is stiffer than Polyethylene which makes possible a lighter weight boat, which kayakers find advantageous. In order to sustain the pedal drive in an ABS kayak, applicant has found a way to support the pedal drive in an insert made of polyethylene that is within the ABS shell or hull. The stresses from the pedal drive are absorbed by the polyethylene or polypropylene housing, avoiding degradation of the ABS shell or hull.

Polyethylene is used to manufacture almost all kayaks sold today because it has better impact strength and is inexpensive relative to other methods/materials. ABS is used by a few kayak makers to manufacture lightweight boats that have better stiffness and shape retention than polyethylene kayaks. Applicant has combined the strengths of the two materials into one pedal-driven boat to produce a lightweight boat the can take the rigors of a pedal drive. As is conventional, the ABS material is preferably coated with an Acrylic cap to inhibit weathering. In one embodiment, the acrylic layer may be Korad™ film, available from PolyOne™ (Avon Lake, Ohio) at http://www.polyone.com/products/films/korad-weatherable-acrylic-films.

Polypropylene is less commonly used in kayaks, but could be substituted for the polyethylene material in the insert.

Figure 1:
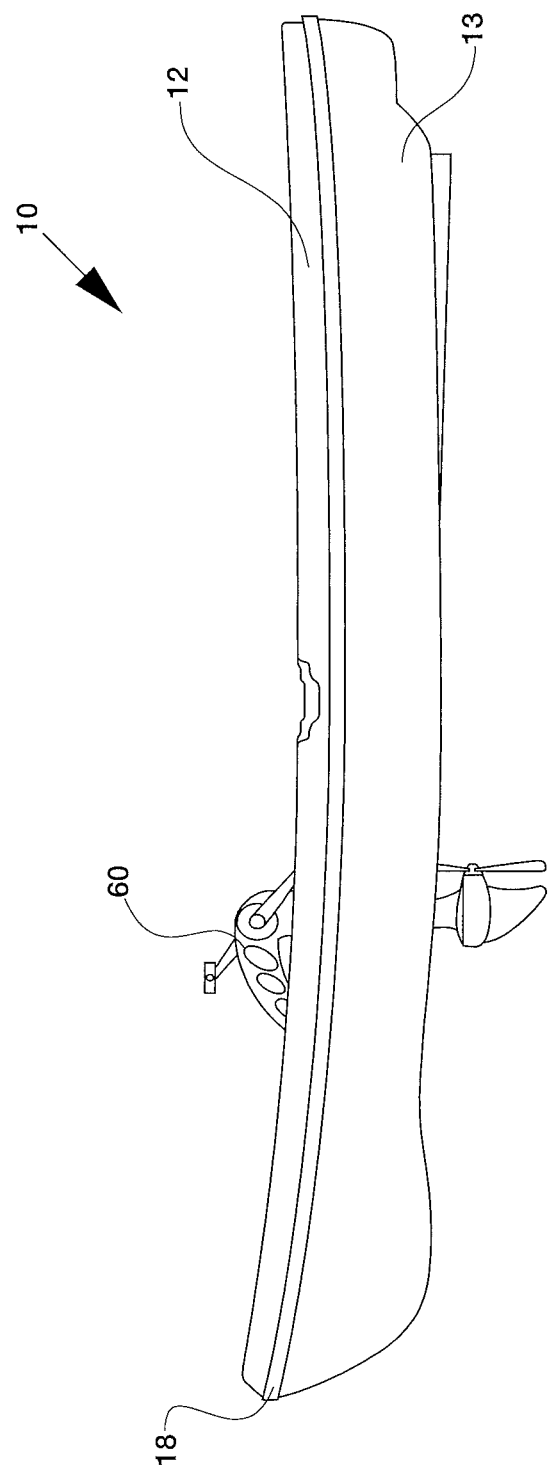
FIG. 1 is a perspective view of a kayak with a thermoformed hull, rotomolded insert and pedal drive.
Figure 2:
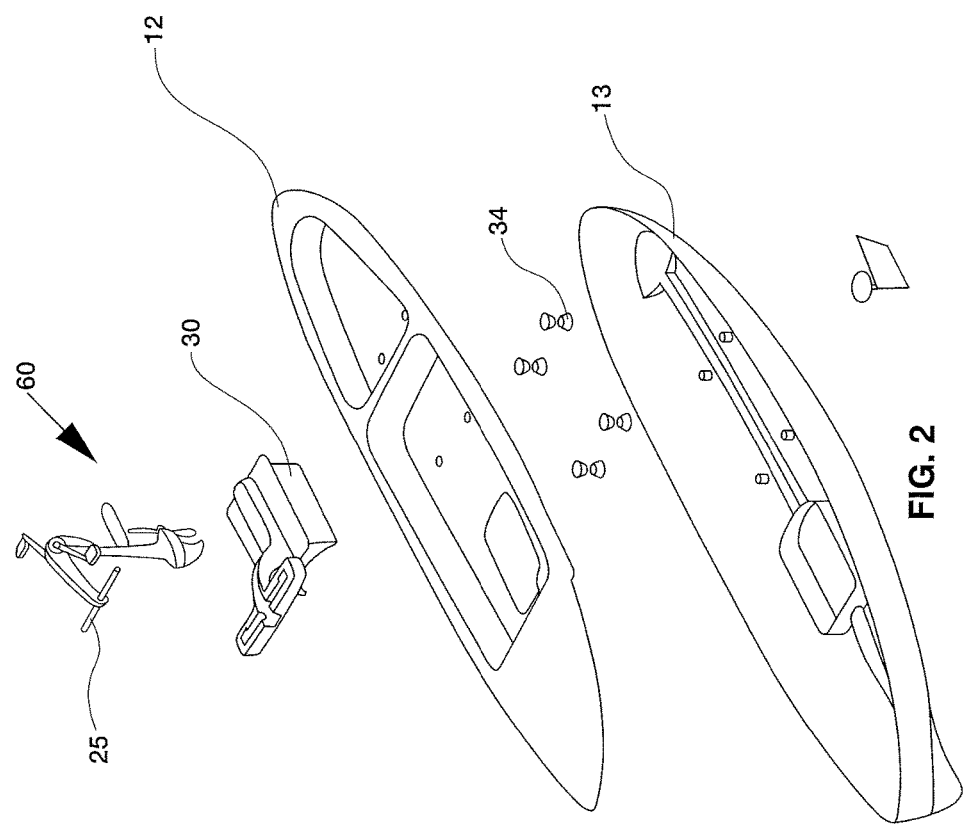
FIG. 2 is an exploded perspective view of the kayak of FIG. 1.
Figure 3:
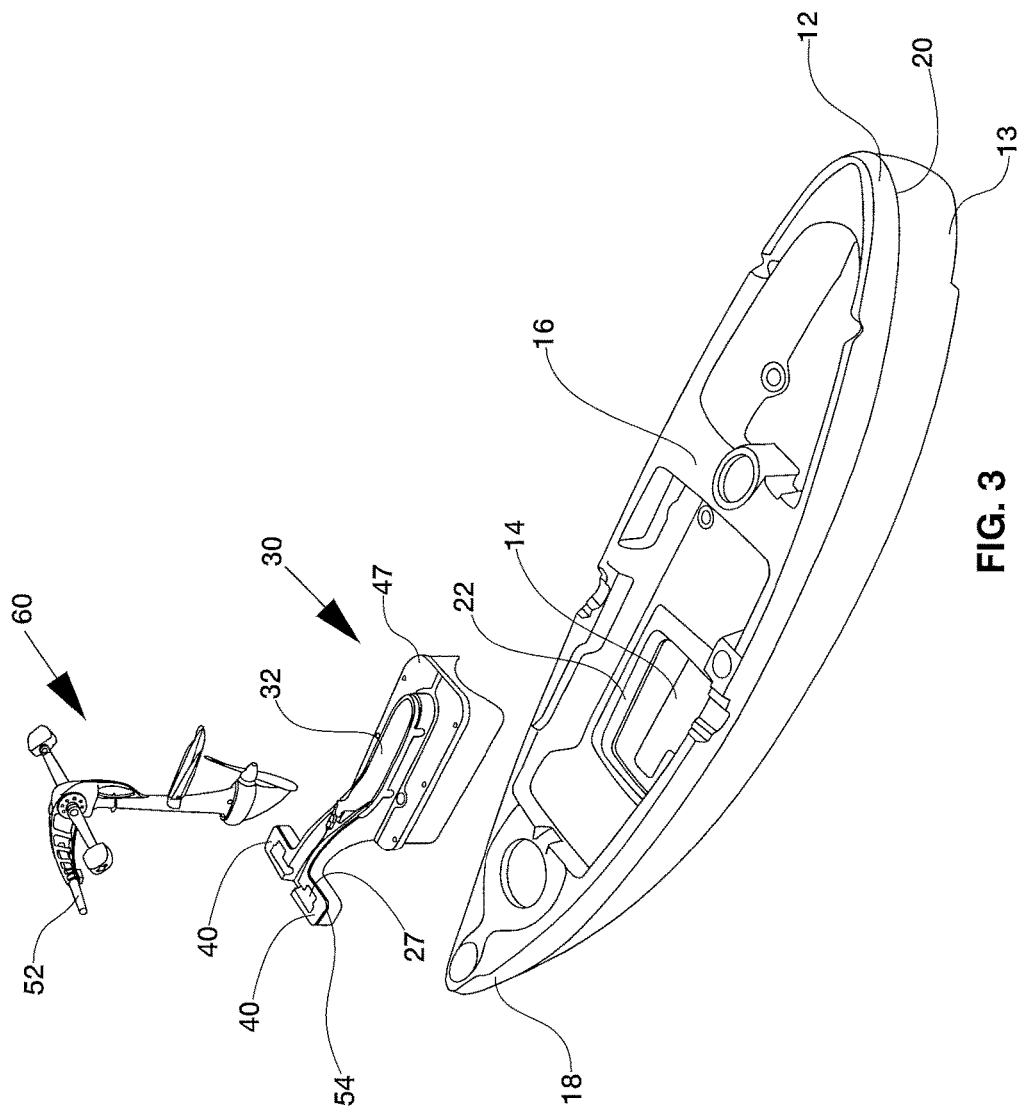
FIG. 3 is a top perspective view of the kayak of FIG. 1 with insert and pedal drive lifted above the hull.

As seen in FIGS. 1-9, the kayak 10 is made of a thermoformed ABS material by mating two thermoformed sheets to form the top 12 and bottom 13 of the kayak and its hull. The top and bottom are formed in shapes that complement one another to make the hull, but with a resulting void 14 between a seat or seat mount 16 and the front 18 of the boat. It is known to make thermoformed ABS kayaks by mating top and bottom molded sheets, but not with the void and not with a pedal drive. The top 12 and bottom 13 are held together in conventional fashion with an acrylic adhesive, making a water-tight seal between the two sheets around the perimeter 20 of the sheets and in the margins 22 surrounding void 14. As seen in FIG. 2, scuppers 34 can also be glued between the top 12 and bottom 13.

Figure 4:
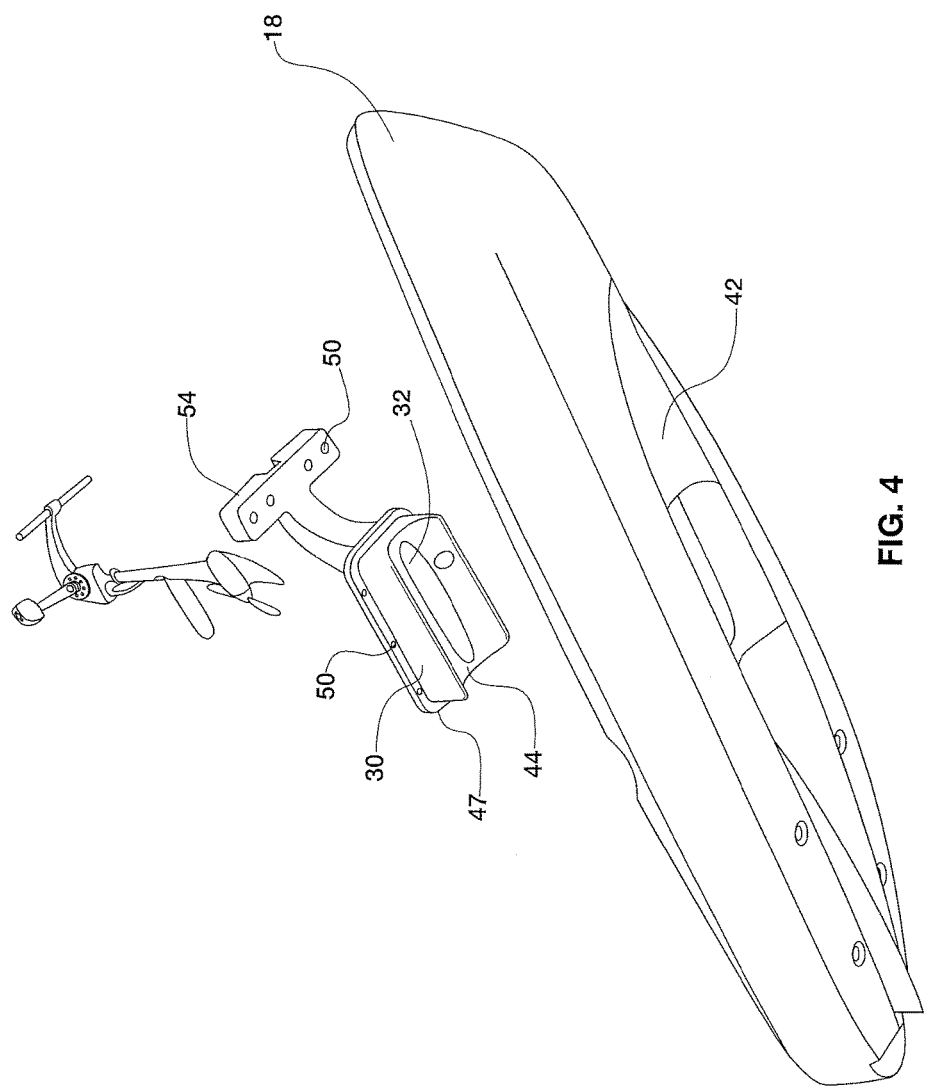
FIG. 4 is a bottom exploded perspective view of the kayak of FIG. 1.
Figure 5:
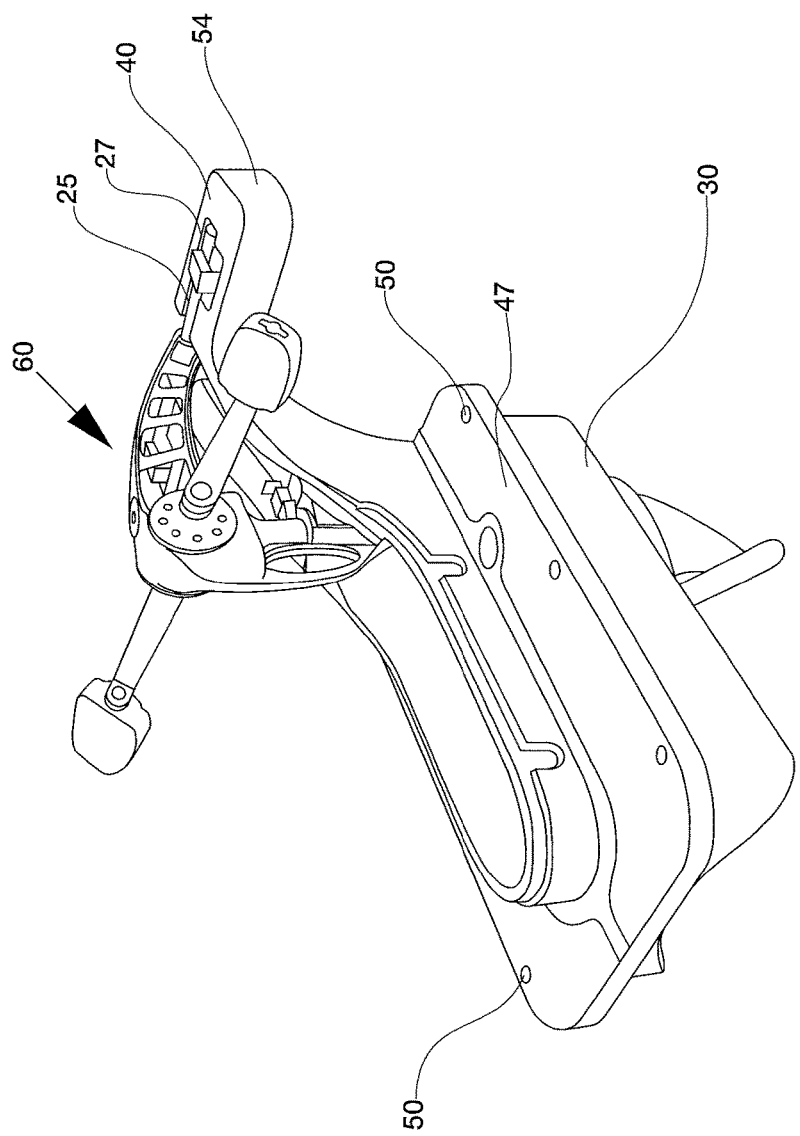
FIG. 5 is an enlarged perspective view of the insert and pedal drive.
Figure 6:
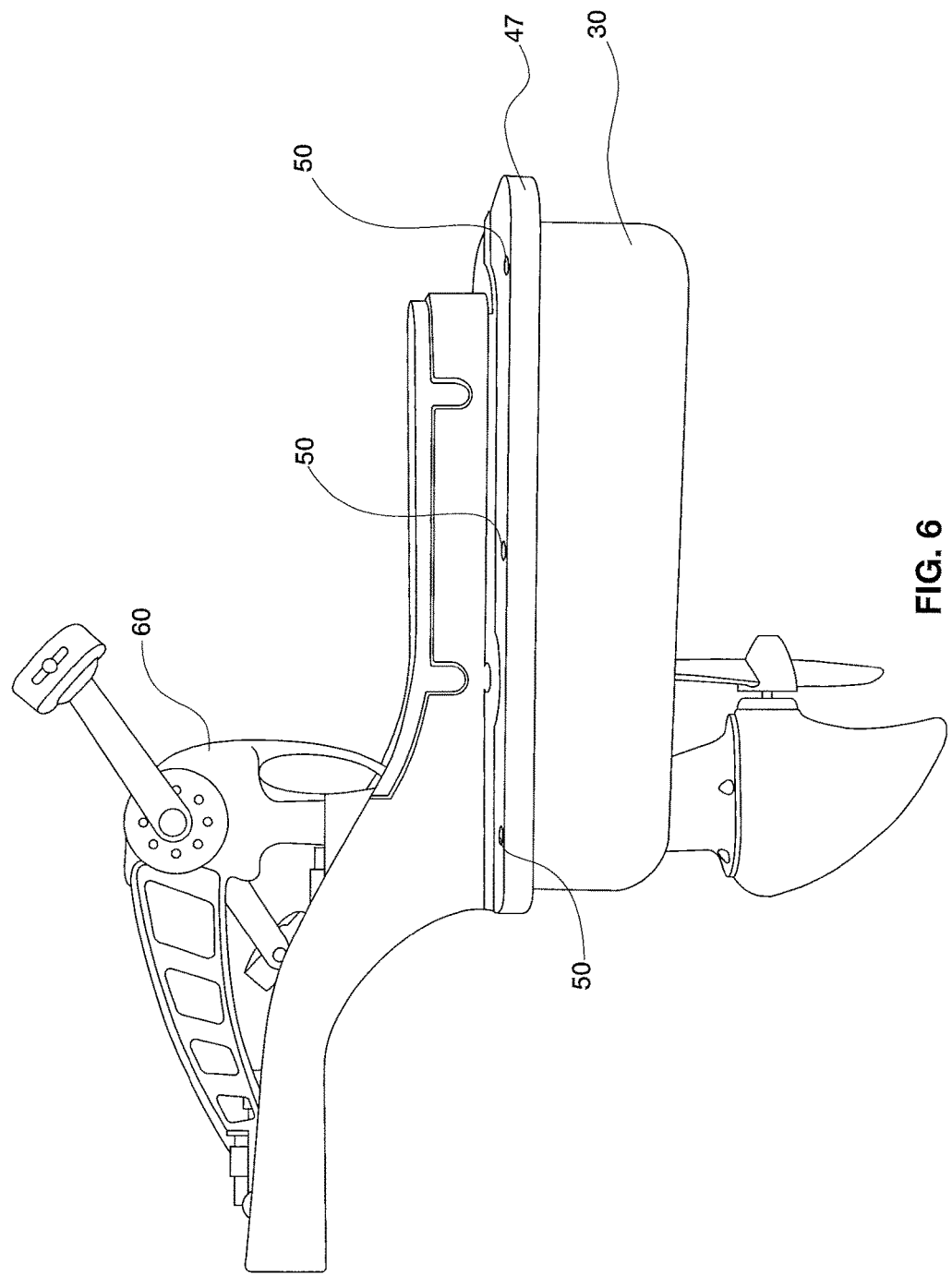
FIG. 6 is a side view of the insert and installed pedal drive.
Figure 7:
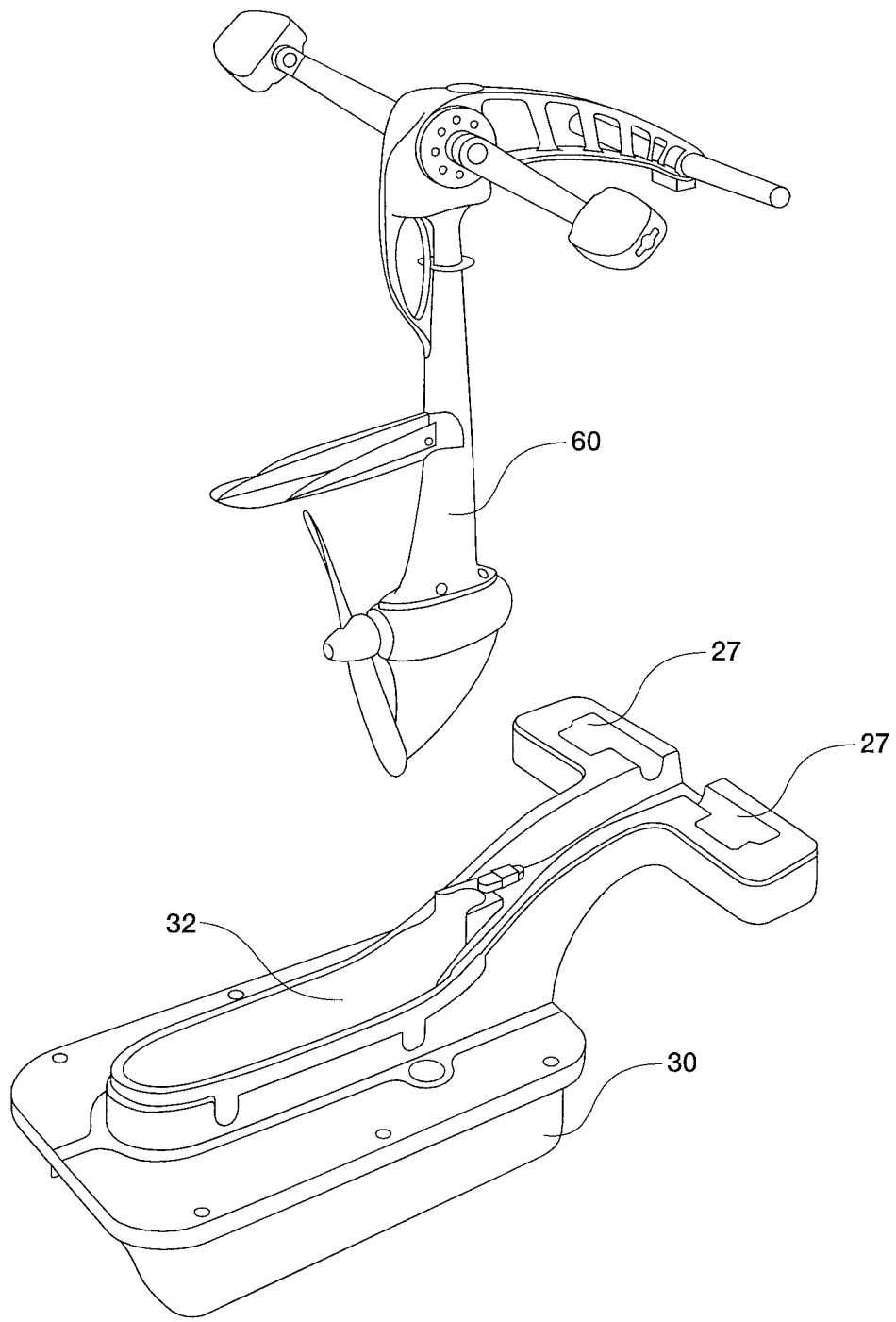
FIG. 7 is an exploded rear perspective view of the insert and pedal drive.

As seen in FIG. 4, the hull may have a shaped bottom 42, and the insert has a conforming shape 44, so the hydrodynamics of the main hull bottom 13 can continue through the insert.

Figure 8:
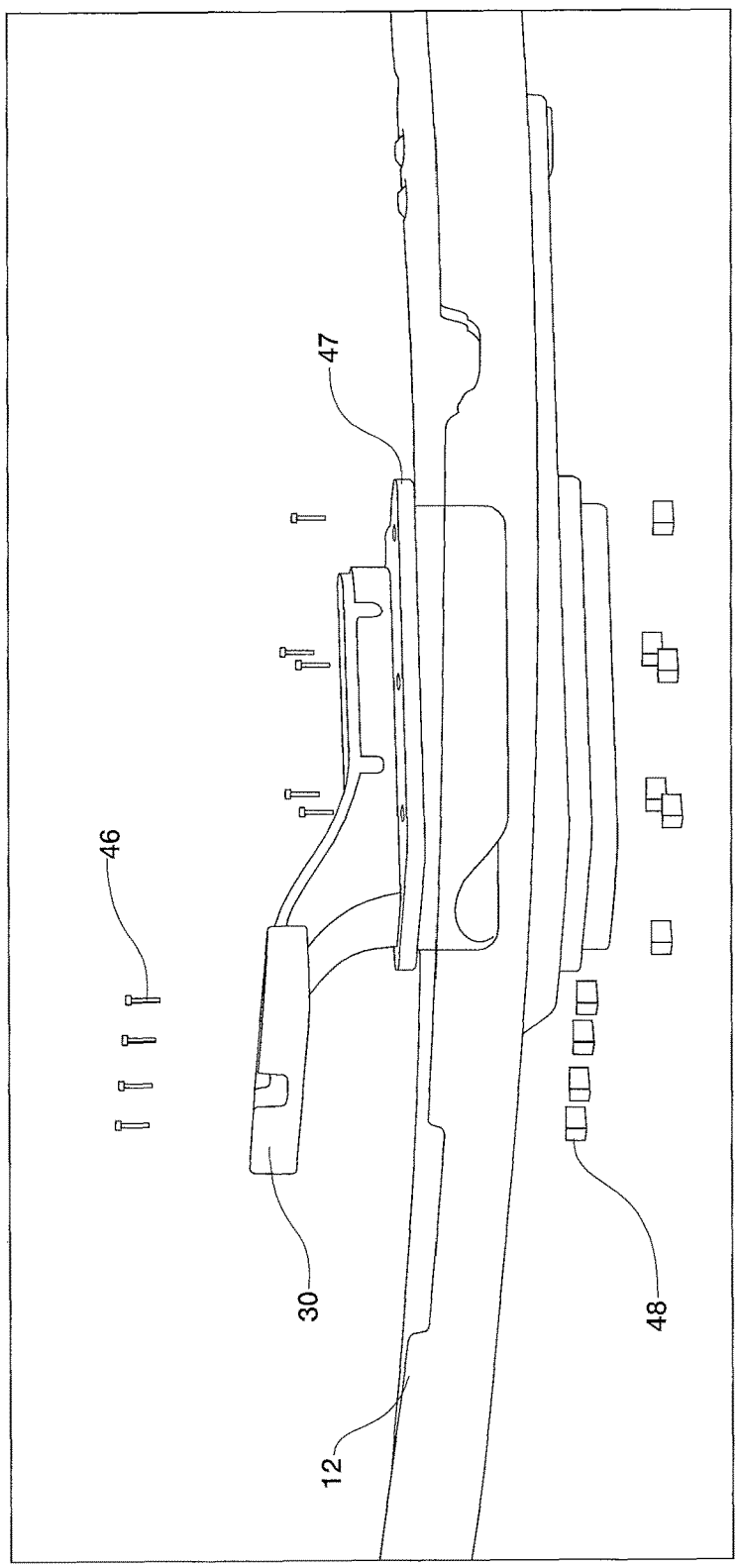
FIG. 8 is an exploded partially sectional view of the insert and a kayak top showing the mode of attachment.
Figure 9:
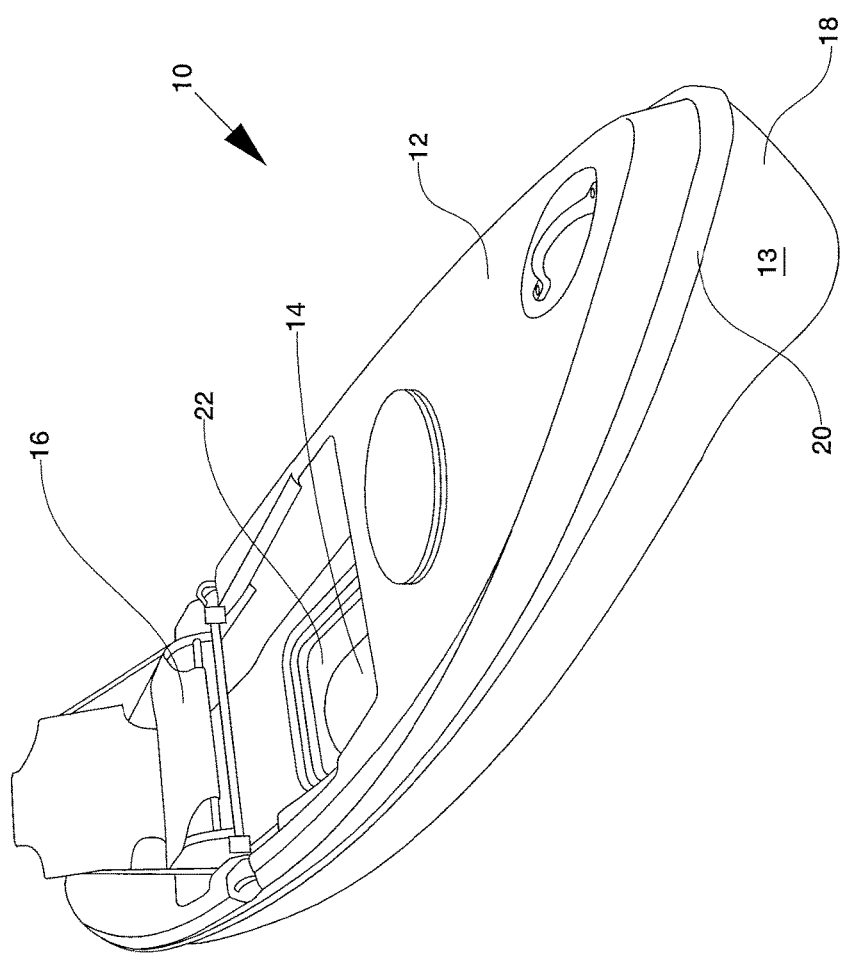
FIG. 9 is a front perspective view of a kayak's thermoformed hull before mounting of the insert or pedal drive.

A separate, rotomolded polyethylene insert 30 is then mounted in the void 14, and held in place by screws 46 that are driven from through-holes 50 in flanges 47 of the insert 30 and into PVC foam blocks 48 glued within the mated top 12 and bottom 13. See FIG. 8. Caulking can help hold the insert to the margins 22 in the void. The top 12 of the hull forms a deck and the PVC block may be glued to a bottom face of the deck. Once the insert 30 mounted in the void 14, it is unlikely that a user will remove the insert from the void during normal use. The insert has an extension forward and upward from the void into a deck-topping portion 54 and that forward portion 54 of the insert has its own set of holes 50 for similar mounting via screws into PVC blocks, as seen in FIG. 8.

The insert 30 itself has an internal opening 32 configured like the internal opening of prior US Patent publication US20160075420 to Kiffmeyer and US20090042461 to Walton. The insert forward portion 54 has deck mounts 40 on thwarts 52 to receive left and right extensions of a pivot shaft 25 extending from the pedal drive 60, like the pivot shaft disclosed in the Kiffmeyer and Walton publications. The deck mounts 40 include two spaced-apart openings 27 with a spring-loaded retractable clip overt each of the openings. With the clips retracted against the force of the spring, the left and right extensions of a pivot shaft 25 can be placed in the openings, so that upon a subsequent release of the clips, the springs cause the clips to cover and capture the extensions within the openings 27. The pivot shaft is free to rotate in the openings 27, so the pedal drive can be pivoted about the pivot shaft, as in the Walton and Kiffmeyer publications and in commercially available Propel kayaks from Native Watercraft of Fletcher, N.C. Retraction of the clips allows the pivot shaft 25 to be lifted out of the insert 30 for removal from the kayak, when desired. Thus, the pedal drive 60 can operate and be operated just like the pedal drives disclosed in those publications and the Native Propel watercraft, but as mounted within the insert 30 in an otherwise thermoformed ABS kayak.

Certain modifications and improvements will occur to those skilled in the art upon reading the foregoing description. For example, although the preferred embodiment is a human-powered pedal drive, a motorized drive could also be used. Also, while the insert is preferably made by rotomolding, it can be made other ways, such as by injection molding or assembly from smaller parts. It should be understood that all such modifications and improvements have been omitted for the sake of conciseness and readability, but are properly within the scope of the following claims.

What is claimed is:

1. An improved kayak comprising
   a hull of thermoformed plastic having a bow and a seat and having a void between the bow and the seat,
   a rotomolded plastic insert comprising a block with a through-hole located in the void and joined to the thermoformed hull by fasteners that pass through the insert and a top portion of the hull and engage a foam PVC block within the hull, and
   a propulsion device mounted in the rotomolded plastic insert that allows a user of the kayak to propel the kayak.

2. An apparatus as claimed in claim 1 wherein the thermoformed plastic of the hull is ABS.

3. An apparatus as claimed in claim 1 wherein the rotomolded plastic of the insert is polyethylene or polypropylene.

4. An apparatus as claimed in claim 1 wherein a top of the hull is a deck and the PVC block is glued to a bottom face of the deck.

5. An apparatus as claimed in claim 1 wherein the propulsion device is removably mounted to the insert.

6. An apparatus as claimed in claim 1 further comprising caulking between the hull and the insert.

7. An apparatus as claimed in claim 1 wherein the propulsion device is a pedal drive.

8. An improved kayak comprising
   a hull of ABS plastic having a bow and a seat having a void between the bow and the seat,
   a polyethylene or polypropylene plastic insert comprising a block with a through-hole located in the void and joined to the hull by fasteners that pass through the insert and a top portion of the hull and engage a foam PVC block within the hull, and
   a propulsion device mounted in the polyethylene or polypropylene plastic insert that allows a user of the kayak to propel the kayak.

9. An improved kayak comprising
   a hull of thermoformed ABS plastic having a bow and a seat having a void between the bow and the seat, a top of the hull being a deck with a foam PVC block glued to a bottom face of the deck,
   a rotomolded polyethylene or polypropylene plastic insert comprising a block with a through-hole located in the void and joined to the hull by fasteners that pass through the insert and the deck of the hull and engage the foam PVC block within the hull, with caulking between the hull and the insert,
   a propulsion device removably mounted in the rotomolded plastic insert that allows a user of the kayak to propel the kayak.

10. A method of making an improved kayak comprising
    thermoforming a kayak deck and thermoforming a kayak bottom, both the kayak deck and kayak bottom having a void between a kayak bow and a kayak seat,
    joining the kayak deck to the kayak bottom to form a kayak hull that has a void between the kayak bow and kayak seat,
    mounting a rotomolded insert in the void, the rotomolded insert comprising a block with a through-hole and configured to receive a propulsion device that allows a user of the kayak to propel the kayak, and
    joining the rotomolded insert to the kayak hull by fasteners that pass through the insert and a top portion of the kayak hull and engage a foam PVC block within the kayak hull.

11. A method as claimed in claim 10 further comprising gluing a foam PVC block to an underside of the kayak deck before joining the kayak deck to the kayak bottom and affixing the insert to the kayak hull by passing fasteners through the insert and the kayak deck top to engage the foam PVC block within the hull.

12. A method as claimed in claim 10 wherein the kayak deck and kayak bottom are thermoformed of ABS plastic.

13. A method as claimed in claim 10 wherein the insert is molded of polyethylene or polypropylene.

14. A method as claimed in claim 10 wherein the insert is rotomolded polyethylene or polypropylene.

\* \* \* \* \*